(No Model.)

J. T. BARLOW.
HARNESS.

No. 368,747. Patented Aug. 23, 1887.

Witnesses
M. E. Fowler
E. J. Siggers

Inventor
John T. Barlow
By his Attorneys
C. A. Snow & Co.

UNITED STATES PATENT OFFICE.

JOHN THOMAS BARLOW, OF JACKSONVILLE, FLORIDA.

HARNESS.

SPECIFICATION forming part of Letters Patent No. 368,747, dated August 23, 1887.

Application filed June 24, 1887. Serial No. 242,408. (No model.)

*To all whom it may concern:*

Be it known that I, JOHN THOMAS BARLOW, a citizen of the United States, residing at Jacksonville, in the county of Duval and State of Florida, have invented a new and useful Improvement in Harness, of which the following is a specification.

My invention relates to an improvement in harness; and it consists in the construction and combination of the parts thereof, which will be fully set forth hereinafter, and pointed out in the claims.

The object of my invention is to provide an improvement in harness by which the draft is taken off the shoulders of the horse and transferred to his breast, the traces passing between the fore and hind legs and attached to the vehicle with or without a whiffletree.

A further object of my invention is to provide an improvement in harness wherein a Dutch collar is used, which is so arranged and provided with attachments as to render it applicable for use with either single or double harness.

The essential feature of my invention consists of the use of the trace passing between the fore and hind legs of the animal, and either passed directly between the hind legs or split to inclose the hind legs, and is attached to a whiffletree, as in the usual manner. If, however, a single trace is used, it is secured to the vehicle by means of a suitable hook-connection. In the use of double harness in connection with my improvement a light variation in construction may be employed, which may be determined at will.

Figure 1:
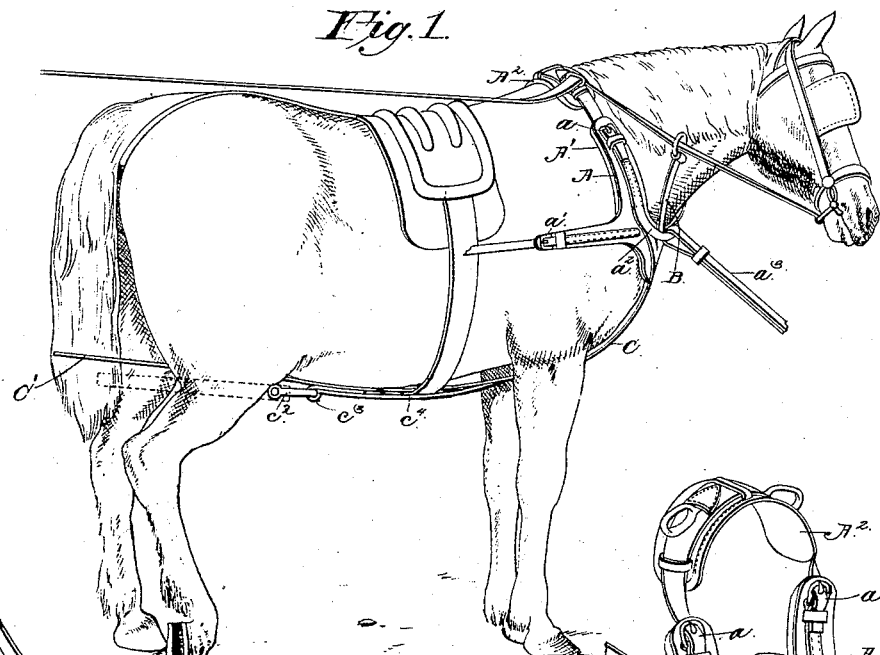
Figure 2:
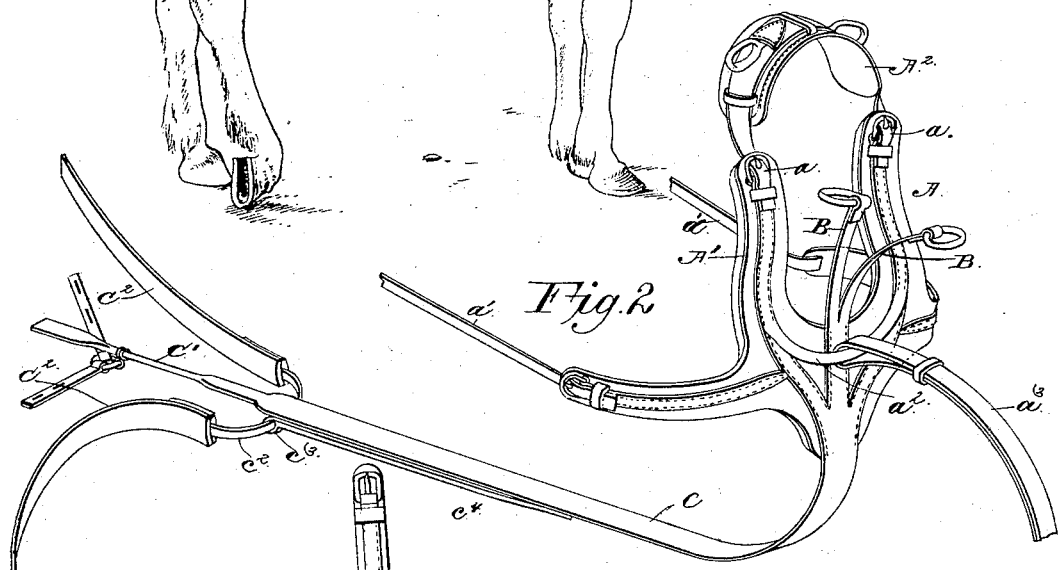
Figure 3:
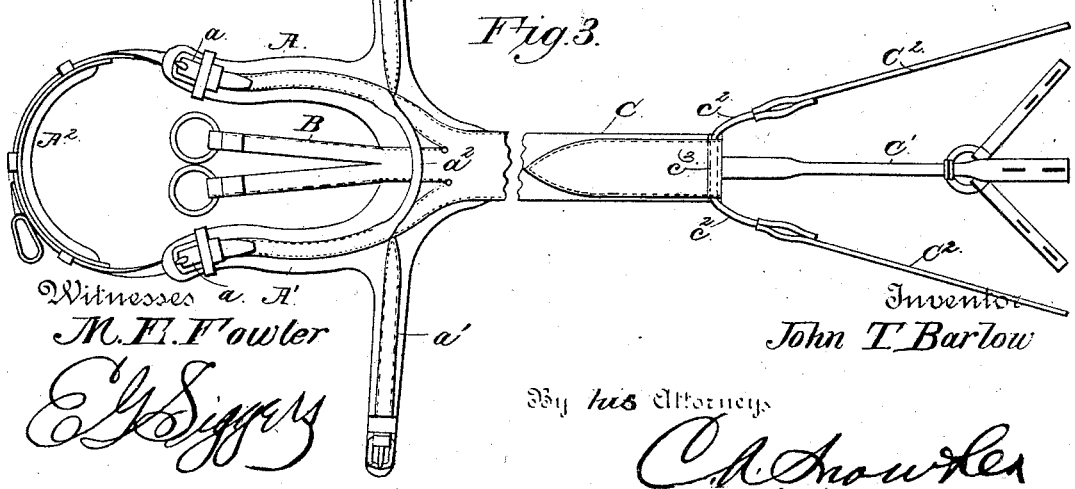

In the accompanying drawings, wherein like letters of reference indicate similar parts in the several views, Figure 1 is a perspective view of my improvement shown mounted upon an animal, and the single trace shown in full lines as passing between the hind legs and the double trace in dotted lines as passing around the hind legs. Fig. 2 is a perspective view of my improvement arranged for double harness. Fig. 3 is a bottom plan view of my improved construction.

A indicates a Dutch collar, having the padded breast-collar A' and the padded neck-strap $A^2$. This neck-strap $A^2$ may or may not be padded, as may be desired, but is preferably so constructed with a padding that it will not gall or injure the neck of the animal. The said neck-strap $A^2$ is adjustably secured in connection with the upper portion of the breast-collar A' by means of buckle-and-strap connections $a\ a$. The top portion of the neck-collar $A^2$ is also provided with single or double terret-rings, which will be governed by the use of the improvement either for single or double harness, as will be readily understood.

The sides of the neck-collar A' are provided with tug-straps $a'$, which may be used in the usual manner, if so desired. In the lower front portion of the said breast-collar is provided a round strap, $a^2$, constructed of suitable material, and which forms a loop for the attachment of the pole-strap $a^3$ when the improvement is adapted to be used with double harness. Secured under the said round $a^2$ is the martingale B, which may be either single or double, and provided with buckles for adjustment, or any other preferred construction, as may be desirable. Secured to the extreme lower portion of the breast-collar A' is a strap, C, which is adapted to pass between the fore legs of the animal, and to which the single trace C' is secured, and consists either of a single attachment, which is secured to a hook fastened to the vehicle, or of double traces $C^2$, which pass around the rear legs of the animal and are secured to the whiffletree, as in the usual form of construction. When a single strap or trace is used, it is passed between the hind legs of the animal and secured by a suitable connection attached to the king-bolt, or to any other portion of the vehicle, as found desirable and most effective. When the double traces $C^2$ are used, working outside of the hind legs, a metallic ring or loop, $c^2$, is provided, which is, in connection with a loop, $c^3$, formed with the rear end of the strap C, and to which loop or ring the double traces are secured. The strap C is also provided with the loop $c^4$, through which the girth passes, as in the usual construction.

When it is adapted to use my improvement in connection with heavy draft work, the parts shown in the drawings will be supplemented by heavier constructions adapted to resist greater strain. In lieu of the strap-connections, draft-chains may be used, which will be arranged in the same manner as in the form hereinbefore described. In mounting my improved harness upon the animal, the collar is arranged in a manner which will be readily understood by those skilled in the art, the strap C being passed down between the fore legs and the girth inserted therethrough, as hereinbefore stated. The single or double traces attached to the said strap C are then passed between or on the outside of the hind legs and secured to the vehicle in any preferred manner.

The advantage of this improved construction and manner of arrangement of the traces consists in bringing the power of the animal to bear upon the said harness from the breast instead of the shoulders, as has heretofore been the custom and manner of centering the draft. This will be obviously apparent from the fact that an animal in drawing a heavy load slightly places himself in a forward position, and in doing this his greatest strength is concentrated from the breast downward. By the use of my improvement the draft is brought to bear upon the breast-collar A', and through the collar is transmitted to the traces, which may be arranged in either of the two forms hereinbefore described. By this means it will be seen that instead of having the draft descend from a point above the plane of attachment of the rear portion of the traces it will be brought to bear in the same or at about the same plane of said attachment. By the use of my improvement, also, and the change of the line of draft, as set forth, there will be less resistance brought to bear, from the fact that the harness will be in engagement with that part of the body of the animal in which the greatest strength is concentrated.

The novelty and utility of my improved device being obviously apparent and appreciable, it is unnecessary to further enlarge upon the same herein.

It is obvious that many minor changes in the construction and combination of the several parts may be made and substituted for those herein shown and described without departing in the least from the nature and principle of my invention.

Having thus described my invention, I claim—

1. The combination, with the breast-collar A', adjustably connected to the neck-collar $A^2$, of the strap C, attached to the lower portion thereof, having a trace or traces mounted in connection therewith and adapted to pass between the fore and rear legs of the animal, substantially as specified.

2. In a harness, substantially as described, the combination, with the breast-collar A', of the neck-collar $A^2$, adjustably secured in connection therewith, substantially as described.

3. In a harness, substantially as described, the combination, with the strap C, passing down between the fore legs, of the double traces $C^2$, substantially as described.

4. The breast-collar A', provided with the round $a^2$, having its ends secured to the breast-collar and the central portion of the round free, in combination with the pole-strap, as set forth.

In testimony that I claim the foregoing as my own I have hereto affixed my signature in presence of two witnesses.

JOHN THOMAS BARLOW.

Witnesses:
C. BUCKMAN,
EDWARD WILLIAMS.